United States Patent
Frederick

(10) Patent No.: US 9,420,095 B2
(45) Date of Patent: *Aug. 16, 2016

(54) METHOD AND SYSTEM FOR PROVIDING DYNAMIC SPEED-DIAL LIST

(75) Inventor: Joel Frederick, Brighton, CO (US)

(73) Assignee: Qwest Communications International Inc., Denver, CO (US)

( * ) Notice: Subject to any disclaimer, the term of this patent is extended or adjusted under 35 U.S.C. 154(b) by 266 days.

This patent is subject to a terminal disclaimer.

(21) Appl. No.: 13/461,344

(22) Filed: May 1, 2012

(65) Prior Publication Data

US 2012/0214454 A1    Aug. 23, 2012

Related U.S. Application Data

(63) Continuation of application No. 12/715,670, filed on Mar. 2, 2010, now Pat. No. 8,189,562, which is a continuation of application No. 11/303,437, filed on Dec. 16, 2005, now Pat. No. 7,697,503.

(51) Int. Cl.
H04M 3/44    (2006.01)

(52) U.S. Cl.
CPC .......... *H04M 3/44* (2013.01); *H04M 2203/551* (2013.01)

(58) Field of Classification Search
None
See application file for complete search history.

(56) References Cited

U.S. PATENT DOCUMENTS

| | | | |
|---|---|---|---|
| 5,905,789 A * | 5/1999 | Will | 379/211.03 |
| 6,005,927 A | 12/1999 | Rahrer et al. | |
| 6,173,049 B1 * | 1/2001 | Malik | 379/207.11 |
| 6,243,459 B1 | 6/2001 | Cannon et al. | |
| 6,678,366 B1 * | 1/2004 | Burger et al. | 379/211.03 |
| 6,731,746 B1 * | 5/2004 | Usami | 379/356.01 |
| 6,760,431 B1 | 7/2004 | Haimi-Cohen | |
| 6,914,977 B2 | 7/2005 | Danner et al. | |
| 6,963,638 B1 * | 11/2005 | Keller | H04M 3/44 370/354 |
| 7,203,289 B2 * | 4/2007 | Jedlicka | 379/112.06 |
| 7,310,317 B2 * | 12/2007 | Yepez et al. | 370/252 |
| 7,697,503 B2 | 4/2010 | Frederick | |
| 7,852,991 B1 * | 12/2010 | Croak et al. | 379/40 |
| 2002/0044642 A1 | 4/2002 | Danner et al. | |
| 2004/0066931 A1 | 4/2004 | Tankhiwale | |
| 2006/0050702 A1 * | 3/2006 | Matsui | H04L 41/0893 370/392 |
| 2014/0080460 A1 * | 3/2014 | Maguire | H04M 1/274583 455/414.1 |

OTHER PUBLICATIONS

U.S. Appl. No. 11/303,437, Final Office Action dated Jul. 8, 2009, 19 pages.
U.S. Appl. No. 11/303,437, Issue Notification dated Mar. 24, 2010, 1 page.

(Continued)

*Primary Examiner* — Chirag Shah
*Assistant Examiner* — Amar Persaud
(74) *Attorney, Agent, or Firm* — Swanson & Bratschun, L.L.C.

(57) ABSTRACT

Methods are provided for managing communications over a communications routing network. A data store is maintained of records of communications links established over the communications routing network between a first endpoint of the communications routing network and multiple second endpoints of the communications routing network distinct from the first endpoint. A frequency analysis is performed of the second endpoints to identify a frequency of establishing a communications link between the first endpoint and each of the second endpoints. A list is generated of a subset of the second endpoints in accordance with a result of the frequency analysis.

18 Claims, 7 Drawing Sheets

(56) References Cited

OTHER PUBLICATIONS

U.S. Appl. No. 11/303,437, Notice of Allowance dated Dec. 1, 2009, 4 pages.
U.S. Appl. No. 11/303,437, Notice of Publication dated Jun. 21, 2007, 1 page.
U.S. Appl. No. 11/303,437, Office Action dated Jan. 7, 2009, 14 pages.
U.S. Appl. No. 12/715,670; Issue Notification dated May 9, 2012; 1 page.
U.S. Appl. No. 12/715,670; Notice of Allowance dated Feb. 2, 2012; 14 pages.

* cited by examiner

METHOD AND SYSTEM FOR PROVIDING DYNAMIC SPEED-DIAL LIST

CROSS REFERENCE TO RELATED APPLICATION

This application is a continuation of U.S. patent application Ser. No. 12/715,670, filed Mar. 2, 2010 by Joel Frederick and entitled, "Method and System for Providing Dynamic Speed-Dial List," which is a continuation of, and claims the benefit of, U.S. patent application Ser. No. 11/303,437 by Joel Frederick, filed on Dec. 16, 2005 and entitled "Dynamic Speed-Dial List," (now U.S. Pat. No. 7,697,503 issued on Apr. 13, 2010), which is hereby incorporated by reference in its entirety.

BACKGROUND

This application relates generally to telecommunications. More specifically, this application relates to dynamically derived information used in establishing telecommunications connections.

The telephone communications system arguably represents the most fundamental of modern telecommunications systems. It operates by providing a mechanism for establishing audio communications links between parties. Over time, the manner in which such connections have been established has changed, offering greater flexibility to users of the systems.

For example, when telephone networks were initially established, connections would be made by a telephone operator who would have access to a board in which physical wires could be plugged. Upon receiving a request from user, the telephone operator would identify the connection required and physically complete it by plugging into this board. Over time, this process became automated with the use of "telephone numbers." As is well known, these numbers act as identifiers of network endpoints with which connections may be made. In a traditional system, a user would "dial" a telephone using a rotary mechanism that would generate pulses corresponding to the telephone number. The originating telephone would be connected to an originating network endpoint and the dialed telephone number would identify a recipient network endpoint. This permitted automated apparatus to establish a connection between the originating and recipient network endpoints, with human parties being able to exchange audio communications using the telephones connected to the network endpoints.

This system developed further with the introduction of dual-tone multifrequency ("DTMF") tones that permitted the identifying telephone numbers to be transmitted as a sequence of tones. Because telephones equipped to generate such tones generally had push buttons corresponding to certain tone pairs, such tones are sometimes referred to in common parlance as "touch tones." Briefly, each touch tone consists of two overlaid tones of different frequencies, the combination of the two frequencies uniquely defining a corresponding number. Usually, each of the two frequencies for each touch tone has a first component drawn from a first set of four frequencies and a second component drawn from a second, distinct, set of four frequencies, thereby defining sixteen possible touch tones.

As memory capabilities of telephones equipped to generate DTMF tones developed, predefined sequences of tones could be stored in memory and generated by a user identifying which particular sequence was desired. This technique is still commonly used and is manifested in the form of a "speed dial list," which may be maintained locally at a user location or may sometimes be performed at a typical telephone switch. Each sequence of tones comprised by the speed dial list generally corresponds to a telephone number that has been input by a user of the telephone and corresponds to a number that the user wishes to have the device remember, either because of the frequency with which the number is used or because of the importance of that particular number. There are a variety of different ways in which the speed dial list may be accessed: some telephones have individual buttons corresponding to each number in the speed dial list; other telephones require the user to enter a tone sequence (say, "* 7") to access the speed dial list, followed by a numerical identifier of which number to use. A user of the telephone may then call desired parties simply by accessing the speed dial list. This may both provide some time savings to make calls quickly and permits the user to contact desired parties without the need for remembering their telephone numbers or having to look them up in a personal or public directory.

While this arrangement has found wide utility among users of telephones, it is inherently limiting because it is entirely static. The numbers in the speed dial list are those that have been directly input by the user. But as the user's circumstances change over time, the telephone numbers that he accesses most frequently also change—certain parties that may have been contacted frequently in the past are later contacted only infrequently, if at all; parties may have moved and acquire new telephone numbers; the user may transfer his business to a provider that provides better financial terms; the user meets new people who he begins to contact frequently; and the like. With such traditional arrangements, keeping the speed dial list current is the responsibility of the user, and this is a task that is frequently neglected by users. Indeed, users may not even be directly aware as it is happening that their calling patterns are in flux, with recognition of changes occurring only once new patterns have been established. But these new patterns themselves are equally ephemeral and will soon be out of date as circumstances continue to change.

More recently, some cellular telephones have implemented functions that retain a list of most recently called numbers. Such a list has some utility, but suffers from a number of drawbacks of purely static lists. In particular, such lists function by continually dropping off the last number on the list and replacing it with the most recently called number, thus also failing to account for the calling patterns of the user. If a user has an issue that requires calling several new numbers even only a single time to address, they will displace the frequently called numbers from the list despite their unique character.

There is accordingly a general need in the art for methods and systems for establishing telecommunications connections that are not limited by such mechanisms.

BRIEF SUMMARY OF THE INVENTION

Embodiments of the invention provide methods and systems for implementing a dynamic communications list that accounts for information regarding the frequency with which certain communications links are made.

Thus, in a first set of embodiments, methods are provided for managing communications over a communications routing network. A data store is maintained of records of communications links established over the communications routing network between a first endpoint of the communications routing network and a plurality of second endpoints of the communications routing network distinct from the first endpoint. A frequency analysis is performed of the plurality of second endpoints to identify a frequency of establishing a communications link between the first endpoint and each of the plurality of second endpoints. A list is generated of a subset of the plurality of second endpoints in accordance with a result of the frequency analysis.

In some embodiments, the list is transmitted to a computational device of a user associated with the first endpoint. In other embodiments, the list is ordered according to the frequency of establishing the communications link between the first endpoint and each of the plurality of second endpoints. In the data store, a static list associated with the first endpoint may also be maintained, identifying a second plurality of second endpoints of the communications routing network. Generation of the list may comprise excluding second endpoints that are comprised by the static list.

There are a number of different ways in which the frequency analysis may be performed. In one embodiment, the frequency analysis is limited to those second endpoints with which a communications link with the first endpoint was established within a defined time period. The defined time period may be defined by a user associated with the first endpoint. In another embodiment, previously identified second endpoints are excluded from the frequency analysis. In various embodiments, communications links initiated from the first endpoint may be included, communications links initiated from one of the second endpoints may be included, or communications links initiated from either the first endpoint or from one of the second endpoints may be included.

The list may be used by receiving an identification of one of the subset of the plurality of second endpoints of the list from the first endpoint. A communications link is then established between the first endpoint and the one of the subset of the plurality of second endpoints.

The list may also be modified over time in response to further communications links being established. A request may be received from the first endpoint to establish a communications link between the first endpoint and one of the plurality of second endpoints. The communications link is then established between the first endpoint and the one of the plurality of second endpoints. The frequency analysis of the plurality of second endpoints is re-performed to include information related to establishing the communications link between the first endpoint and the one of the plurality of second endpoints.

In a second set of embodiments, a method is provided for managing telephone communications over a telephone network. A data store is maintained of telephone records of telephone calls between a first telephone number and a plurality of second telephone numbers distinct from the first telephone number. A frequency analysis is performed of the plurality of second telephone numbers to identify a frequency of telephone calls between the first telephone number and each of the plurality of second telephone numbers. A list is generated of a subset of the plurality of second telephone numbers in accordance with a result of the frequency analysis.

In some embodiments, the list is transmitted to a computational device of a user associated with the first telephone number. In the data store, a static list associated with the first telephone number may also be maintained, identifying a second plurality of second telephone numbers provided by a user associated with the first telephone number. The list may exclude second telephone numbers that are comprised by the second list. In some instances, the frequency analysis may be limited to those second telephone numbers with which a telephone call was made within a defined time period.

In one embodiment, an identification is received of one of the subset of the plurality of second telephone numbers of the list from a user associated with the first telephone number. A telephone call is established between the first number and the one of the subset of the plurality of second telephone numbers.

In another embodiment, a request is received from the first telephone number to call one of the plurality of second telephone numbers. A telephone call is established between the first telephone number and the one of the plurality of second telephone numbers. The frequency analysis is re-performed of the plurality of second telephone numbers to include information related to establishing the telephone call between the first telephone number and the one of the plurality of second telephone numbers.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Embodiments of the invention describe methods and systems that permit implementation of a dynamic speed dial list. While the description below is made generally in terms of telephone communications, it will be appreciated by those of skill in the art that this is not a limitation of the invention, which may more generally be implemented in the context of any telecommunications system. To emphasize this generality of the invention, reference is made more generally herein to "communications lists," with the description illustrating how both static and dynamic versions of such lists may be implemented.

A "dynamic" list is a list that changes over time, with embodiments of the invention enabling implementation of a list that changes automatically in accordance with algorithmic criteria that may be fixed or may be specified individually by different users. Briefly, in the context of a telephone communications system, such a dynamic list may automatically include those telephone numbers that are most frequently called by a user and/or are most frequently initiating calls to the user. At a given time, the list may include a certain number of telephone numbers, with the list changing in accordance with the communications patterns of the user.

While there is a wide diversity of circumstances that may impact the communications patterns of individual users, the following example is provided to illustrate how such communications patterns may change and automatically be accommodated by embodiments of the invention. For instance, a particular user may live in a particular neighborhood, with a current version of the dynamic list including telephone numbers of friends and businesses that are frequently contacted. The user decides to purchase a new home in different neighborhood, not a great distance from her current home but sufficiently far that it will ultimately impact the patronage of some businesses. When the user is in the process of selling her current home and purchasing the new home, there may be frequent contact with a realtor, causing the realtor's telephone number to be added to the dynamic list and to rise to near the top of the list. After the move is complete, contact with the realtor may drop off, causing the number to drop to the bottom of the list and eventually off the list. The numbers of local businesses that are substituted as a result of the move will similarly drop down and off the list, to be replaced by numbers of the new businesses that are contacted by the user. Similarly, the user's circle of acquaintances and friends may be impacted by the move, causing numbers for individuals who are less frequently contacted to drop off the list and be replaced by those of individuals who are now more frequently contacted. This type of change is ongoing continuously as the communications patterns of the user shift over time. While most of the description below is general, reference is sometimes made to this example to illustrate certain points.

Figure 1:
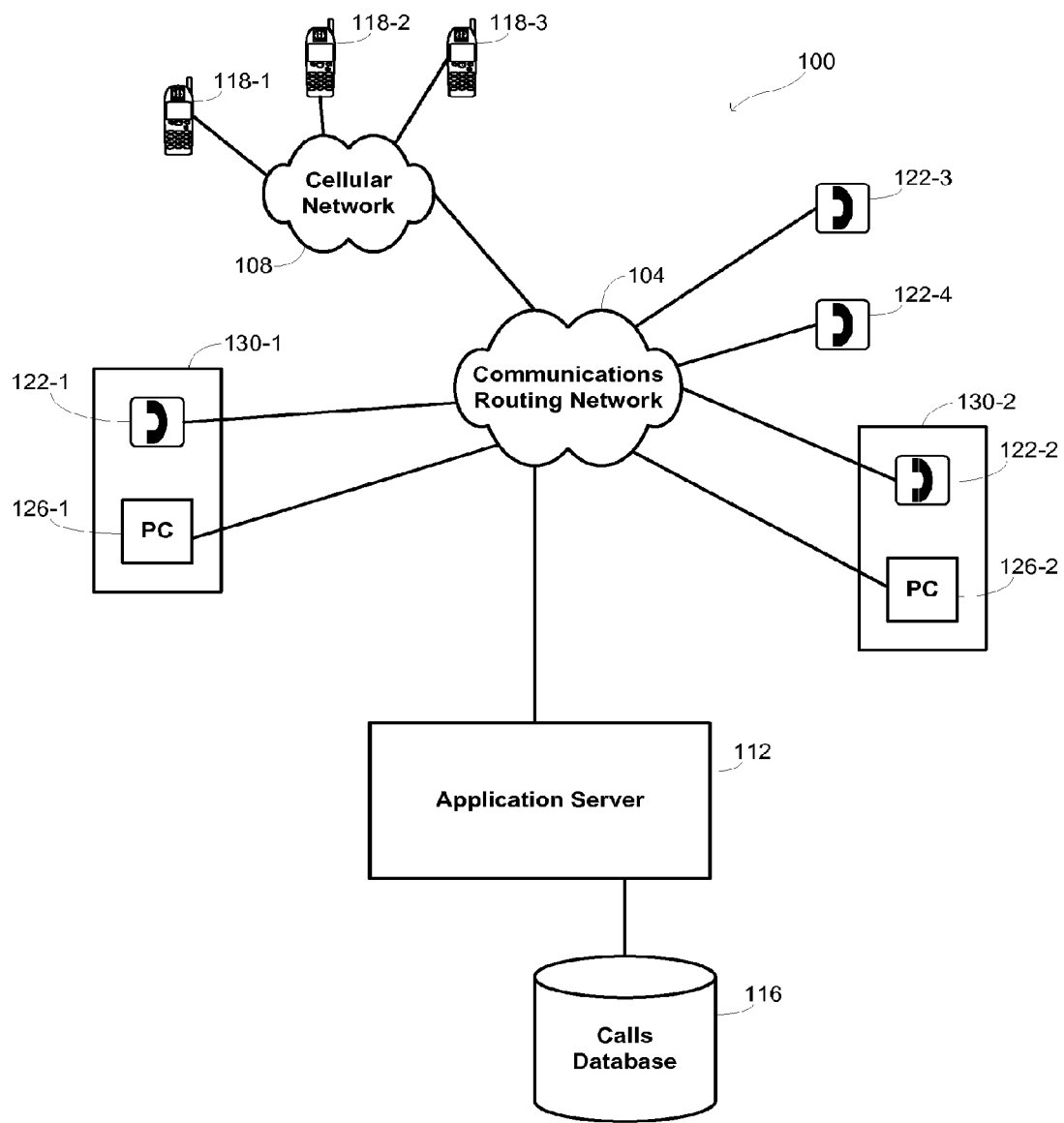
FIG. 1 is a schematic diagram that provides a structural overview of a system within which methods of the invention may operate to establish connections between parties over telecommunications networks.

The dynamic list may be implemented within a telecommunications system, one example of which is shown for illustrative purposes in FIG. 1. In this drawing, communication links between parties are effected by a communications routing network 104. Where the communications routing network 104 comprises a telephone network, the communication links connect telephones 122. In some instances, the communication links may be effected with cellular devices such as cellular telephones 118 by routing information through a cellular network 108 provided in communication with the communications routing network 104. Embodiments of the invention make use of an arrangement by which customers may additionally have computational devices 126 interfaced with the communications routing network 104. Such computational devices 126 are used to access functionality and to provided instructions to initiate the desired communication links. In the illustration, the computational devices 126 are shown as personal computers. Typically, each user who has a computational device 126 interfaced with the communications routing network 104 will also have a telephone 122 interfaced with the network 104. This is illustrated with blocks 130, where the telephone 122 and computational device 126 within each block are under common control by a party. Communication links may be established with telephones 122 that are not associated with commonly controlled computational devices, as illustrated with telephones 122-3 and 122-4.

The manner in which communication links may be initiated may thus depend on whether a particular user is interfaced with the communications routing network 104 only with a telephone 122 or is interfaced with both a telephone 122 and a computational device 126. If interfaced with only a telephone 122, say with telephone 122-3, a link may be initiated by the user dialing the telephone 122-3 to transmit the number of the desired party to the communications routing network 104. The network 104 identifies the network endpoint corresponding to the dialed number, say with cellular telephone 118-2, and establishes a communications link, in this instance routing data over the cellular network 108 to effect communications between telephone 122-3 and cellular telephone 118-2. If interfaced with both a telephone 122 and a computational device 126, say with telephone 122-1 and computational device 126-1 in block 130-1, the request may be initiated by using the computational device 126-1, which transmits both an identification of the user's telephone 122-1 and the telephone number of the desired party, say the number associated with telephone 122-4. Inclusion of the identifier for the user's telephone 122-1 may be performed automatically with software resident on the user's computational device 126-1. Receipt of the request causes the communications routing network 104 to establish a link between both telephones, i.e. between telephones 122-1 and 122-4 by ringing both telephones. From the perspective of the user initiating the call, he provides information with his computational device, causing his own telephone to ring; the telephone of the called party simply rings in conventional fashion to indicate that a communications link is being established.

Embodiments of the invention described below make use of an arrangement in which the calling party has both a telephone 122 and a computational device 126 interfaced with the communications routing network 104. But such a description is not intended to be limiting since the dynamic communications lists may be implemented in other arrangements directly with telephones. Often in such embodiments, the telephones may have computational capacity in addition to traditional passive telecommunications functionality that permits them to mimic the functions described below for the computational devices 126. In addition, it may be advantageous for such telephones to be equipped with screens sufficient to display information like that described below for displays by the computational devices 126 or to be connected to such displays.

The operation of the communications routing network 104 may be controlled with an application server 112, which draws on information in a variety of databases to determine how to route information to establish the communications links. In addition, the application server 112 may make use of a calls database 116 that stores information regarding incoming or outgoing calls to each of the users. Such information is used as described below in generating and maintaining dynamic lists.

Figure 2:
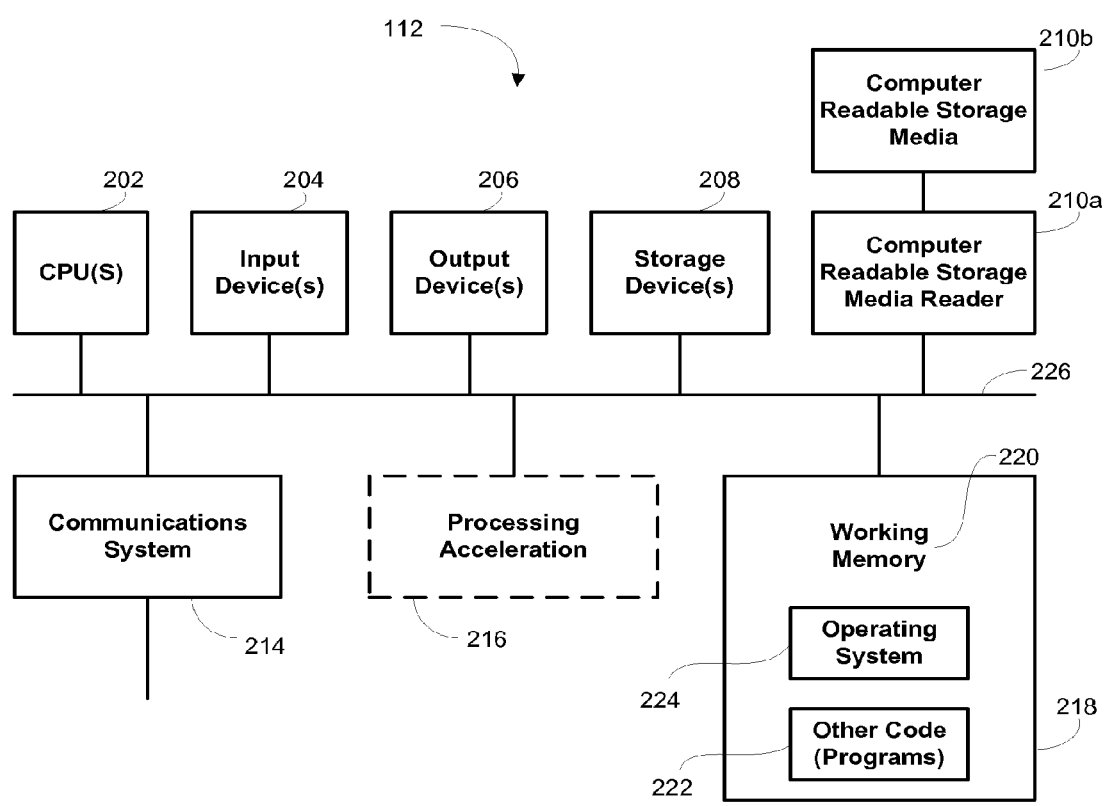
FIG. 2 is a schematic illustration of an application server used with the system of FIG. 1 and on which methods of the invention may be embodied.

FIG. 2 provides a schematic illustration of a structure that may be used to implement the application server 112. FIG. 2 broadly illustrates how individual system elements may be implemented in a separated or more integrated manner. The application server 112 is shown comprised of hardware elements that are electrically coupled via bus 226, including a processor 202, an input device 204, an output device 206, a storage device 208, a computer-readable storage media reader 210*a*, a communications system 214, a processing acceleration unit 216 such as a DSP or special-purpose processor, and a memory 218. The computer-readable storage media reader 210*a* is further connected to a computer-readable storage medium 210*b*, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged over the communications routing network 104 with devices provided in communication with the communications routing network, as described in connection with FIG. 1. The storage device 208 may comprise the calls database 116 in some embodiments.

The application server 112 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3:
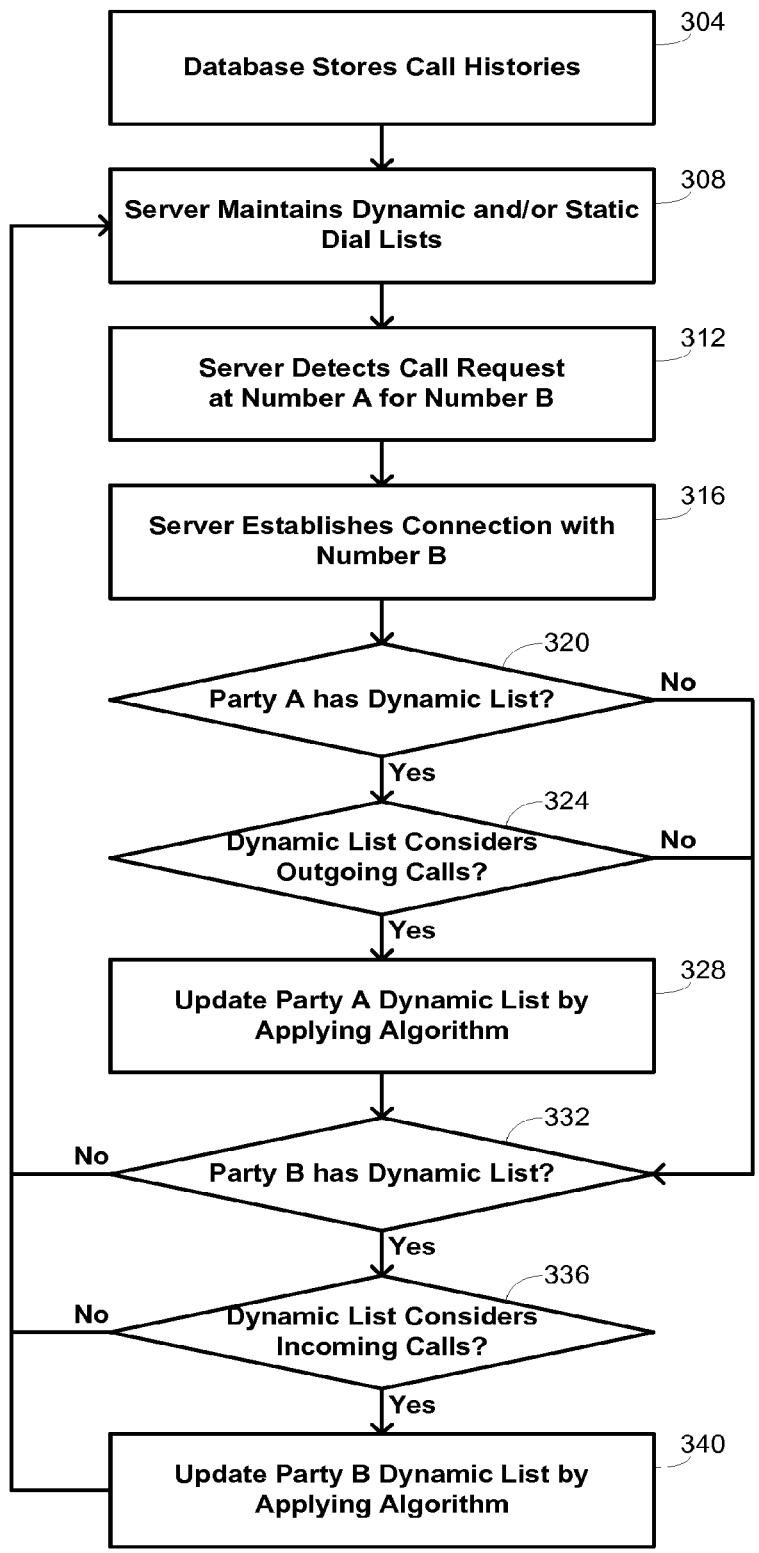
FIG. 3 is a flow diagram illustrating methods of the invention for establishing connections between parties and maintaining data used in generating dynamic communications lists.

The flow diagram of FIG. 3 provides a summary methods that may be performed by the application server 112 to use and maintain dynamic lists for users. Storage of call histories used in generating and maintaining the lists is denoted at block 304, with call histories generally being stored in the calls database 116. As indicated at block 308, the application server 112 maintains dynamic and/or static lists on behalf of users and derived from information in the calls database 116. Similar to the prior art, the content of a static list, if maintained for a particular user, is defined by that user. In contrast, the content of a dynamic list, if maintained for a particular user, is defined according to parameters of an algorithm.

There are a number of different algorithms that may be applied in different embodiments, and the system may advantageously be configured to permit individual users to provide parameters defining how the algorithm is applied. It is anticipated that most algorithms will be variations of a basic algorithm in which the dynamic list provides an ordered sequence of numbers called over a defined period of time, with the numbers called most often being at the top of the list. The list may be limited to a particular number of entries, such as five or ten, and the defined period of time will generally be sufficiently long to have statistically relevant data but not so long as to be distorted by out-of-date information. Suitable time periods may be three months, six months, or a year; the most suitable time period may vary for different users depending on their usage patterns, with shorter time periods being more suitable for individuals whose calling patterns change more quickly over time and longer time periods being more suitable for individuals whole calling patterns change relatively slowly. Also, the scope of numbers that are included may be restricted or expanded with different algorithms. In some algorithms, for instance, numbers that call the user may be included in defining the dynamic list in addition to those called by the user. In other algorithms, certain numbers may be excluded from the calculations, being specified individually or according to some generalized identification, such as having one or more identified area codes, having numbers in foreign countries, or the like. Another basis for excluding numbers could be that the numbers correspond to private calls that have no caller-id information. In still other algorithms, a weighting may be applied in determining entries on the list. The weighting could use aspects of the numbers, such as by weighting local numbers more heavily than long-distance numbers, by weighting land-line numbers differently than cellular numbers, or by weighting numbers with certain area codes differently than other numbers. Alternatively, the weighting could be temporal. For instance, even if the dynamic list is derived with data spanning a particular time period, more recent data could be weighted more heavily than older data. Such embodiments would then embrace a compromise in balancing the potential relevance of older data with the recognition that such relevance is diminished by the age of the data. In embodiments where a particular user has both static and dynamic lists, an additional constraint may be imposed on the algorithm by prohibiting entries from simultaneously being on the static and dynamic lists; usually this is accomplished by permitting the user to include whatever entries desired on the static list and removing any duplicates from the dynamic list. While this additional constraint may be imposed, it is not required, and other embodiments will have duplicates on the static and dynamic lists.

The application server 112 thus generally responds to detection of call requests being made over the communications routing network 104. Thus, when the application server 112 detects a call request an number A for number B at block 312, it responds by assisting in the establishment of a communications link between network endpoints associated with numbers A and B at block 316. This call has the potential to affect a dynamic list being maintained for the user associated with number A ("party A") as well as to affect a dynamic list being maintained for the user associated with number B ("party B"). If a dynamic list is being maintained for party A, as checked at block 320, a further check is made at block 324 whether that list accounts for outgoing calls. If so, that dynamic list is updated at block 328 by applying the algorithm appropriate for that dynamic list. Similarly, if a dynamic list is being maintained for party B, as checked at block 332, a further check is made at block 336 whether that list accounts for incoming calls. If so, that dynamic list updated at block 340 by applying the algorithm appropriate for that dynamic list. After updating the dynamic lists as appropriate, the server 112 returns to a state of maintaining the dynamic and/or static lists and monitoring the network for further call requests.

Figure 4A:
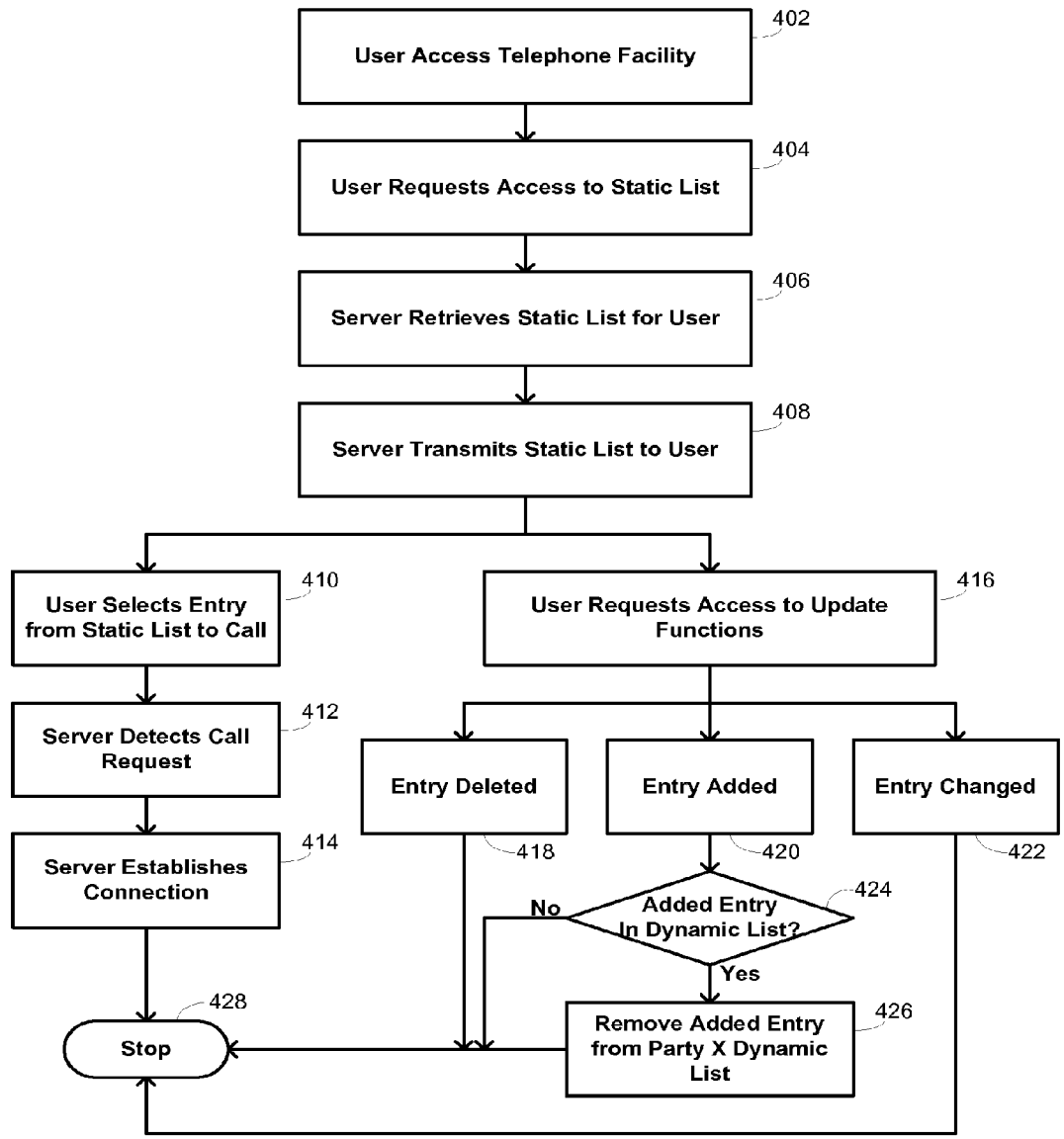
FIG. 4A is a flow diagram illustrating methods of using a static communications list in embodiments that comprise both static and dynamic communications lists.
Figure 4B:
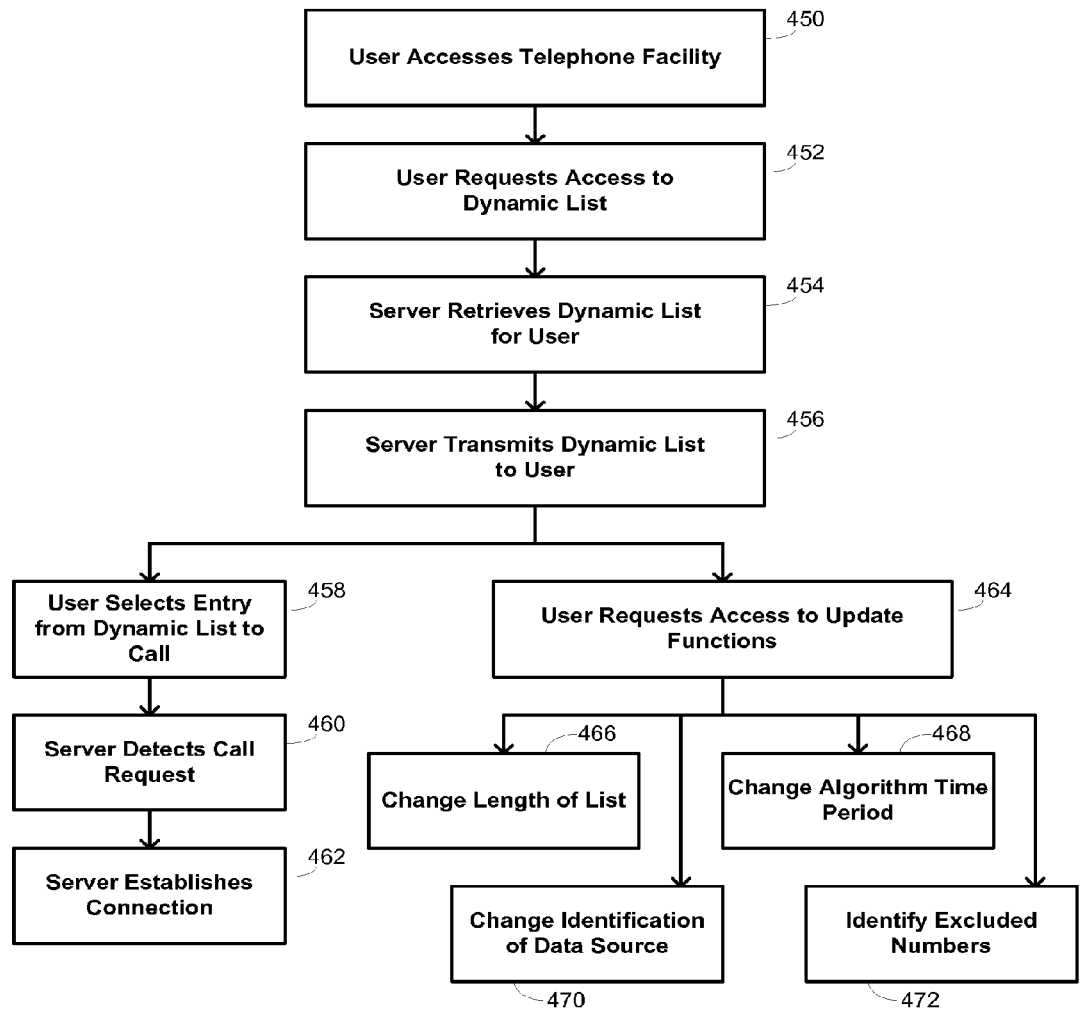
FIG. 4B is a flow diagram illustrating methods of using a dynamic communications list in embodiments that comprise both static and dynamic communications lists.

FIGS. 4A and 4B provide flow diagrams illustrated how the methods of the invention may be implemented from a perspective of a user. The following description of these flow diagrams also makes reference to FIGS. 5A-5D, which are examples of displays that may be provided to the user on her computational device 126 while implementing the methods described in connection with FIGS. 4A and 4B. These exemplary displays are provided merely for illustrative purposes and are not intended to limit in any way how information is exchanged among the user, the communications routing network 104, and the application server 112 in specific embodiments.

Figure 5A:
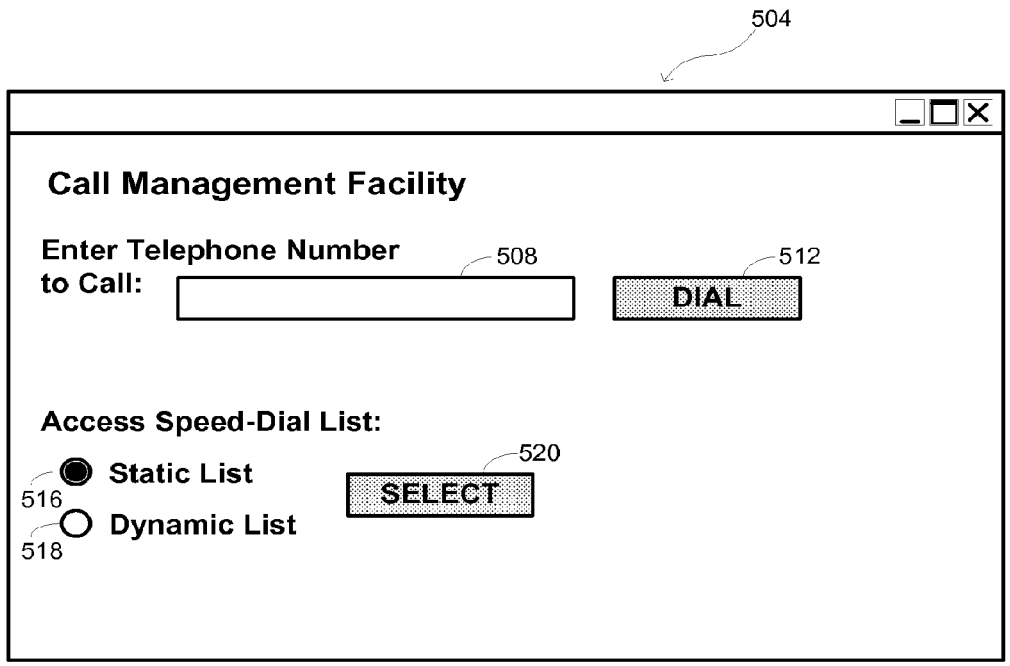
FIGS. 5A-5D provide exemplary screen shots that may be presented to a user when implementing aspects of the methods of FIG. 4A or 4B.
Figure 5B:
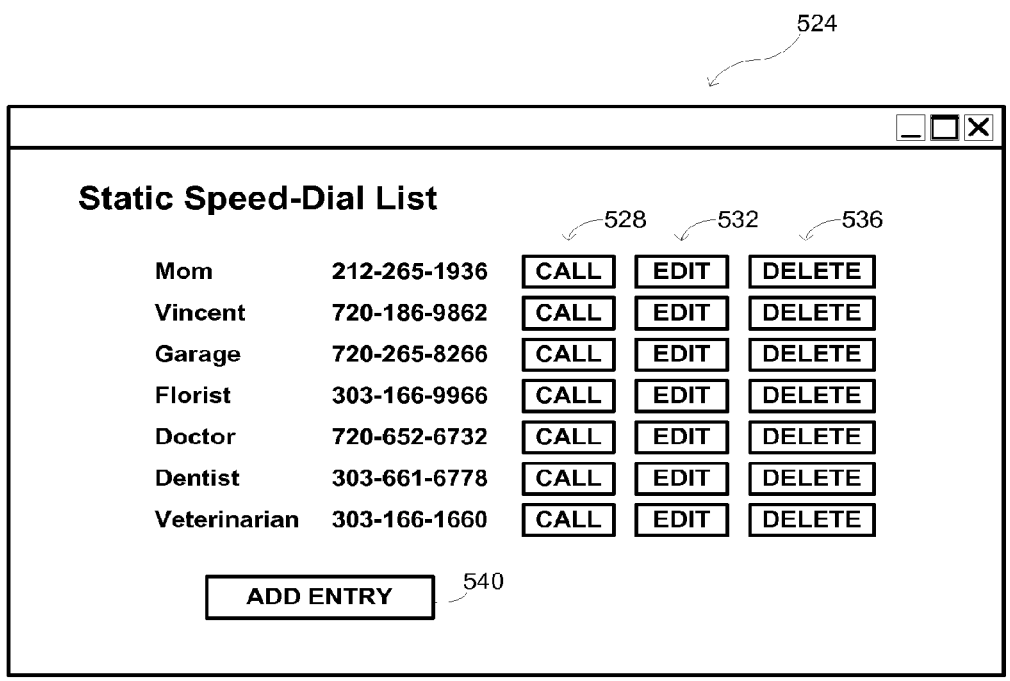

The flow diagram of FIG. 4A illustrates how functions associated with a static list maintained for a user may be implemented. Such methods may begin with the user accessing a telephone facility on her computational device 126 at block 402. FIG. 5A provides an example of a screen 504 that may be presented to the user upon accessing such a facility. The structure of the screen 504 reflects that such a facility may be used as described above to initiate calls to other parties. In particular, the user may enter a telephone number to call in field 508 and click a button 512 to establish a connection. The system responds to such an action by causing both the user's telephone to ring and the telephone of the called party to ring, with the connection being established when both answer.

An alternative way to establish a connection is by using the static or dynamic lists. In embodiments where both are maintained for a user, as illustrated with screen 504 in FIG. 5A, some mechanism may be provided to select one of the lists, such as with a pair of radio buttons 516 and 518 and a SELECT button 520. A different interface may be provided in embodiments where only a static list is maintained, where only a dynamic list is maintained, or where neither a static nor dynamic list is maintained for a particular user. If the user wishes to request access to the static list at block 404 of FIG. 4A, this may be done by selecting radio button 516 and clicking the select button 520. The application server 112 responds by retrieving and transmitting the user's static list at blocks 406 and 408. This may be done by transmitting a screen 524 like the one shown in FIG. 5B, with which the user may subsequently interact to use the static list.

The static list comprises an identification of parties who may be contacted, in this instance by indicating both a name for each party and the party's telephone number. Buttons are also provided to initiate a connection (blocks 528), to edit information for a particular entry (blocks 532), and to delete a particular entry (blocks 536). A separate button 540 may be used to add additional entries to the static list.

The left prong of FIG. 4A shows functions that may be performed if the user has accessed the static list to establish a communications link. At block 410, the user selects an entry from the static list to call by clicking the corresponding CALL button 528, causing the computational device 126 to transmit a call request to the communications routing network 104. At block 412, the application server 112 detects the call request and establishes a connection at block 414.

The right prong of FIG. 4A shows other functions that may be performed with the static list, most of which are administrative in nature. These functions may be accessed in response to a user request at block 416. For example, in an embodiment where an entry is to be deleted from the list, the user may click a corresponding one of the DELETE buttons 536 shown in FIG. 5B, with the application server 112 responding at block 418 by deleting the entry. Similarly, in an embodiment where particulars of an entry are to be modified, such as by updating information for the entry, the user may click a corresponding one of the EDIT buttons 532 shown in FIG. 5B, with the application server 112 responding at block 422 by providing an interface for collecting the updated information and then updating the entry at block 422. In an embodiment where an entry is to be added, the user may click the ADD ENTRY button 540 to be presented with a screen requesting information for the entry such as a name identifier and telephone number. The entry is accordingly added at block 420. In embodiments where the user has both dynamic and static lists, a check may be performed at block 424 to determine whether the new entry added to the static list already exists in the dynamic list. If so, the added entry may be removed from the dynamic list so that there is no overlap between the static and dynamic lists. As previously noted, some embodiments of the invention may impose such a constraint as an additional limitation on the algorithm used to define the dynamic list, but this is not required in all embodiments.

Once the desired operations are performed, the method stops at block 428.

The flow diagram of FIG. 4B illustrates how functions associated with a dynamic list maintained for a user may be implemented. Just as for the methods described in connection with FIG. 4A, such methods may begin with the user accessing a telephone facility on her computational device 126 at block 450. This facility may be identical to the one accessed at block 402 of FIG. 4A, and shown in FIG. 5A. In the methods of FIG. 4B, however, the user requests access to the dynamic list at block 452, such as by activating radio button 518 and clicking the SELECT button 520. The application server responds at block 454 by retrieving the dynamic list for the user and transmitting it to the user at block 456.

Figure 5C:
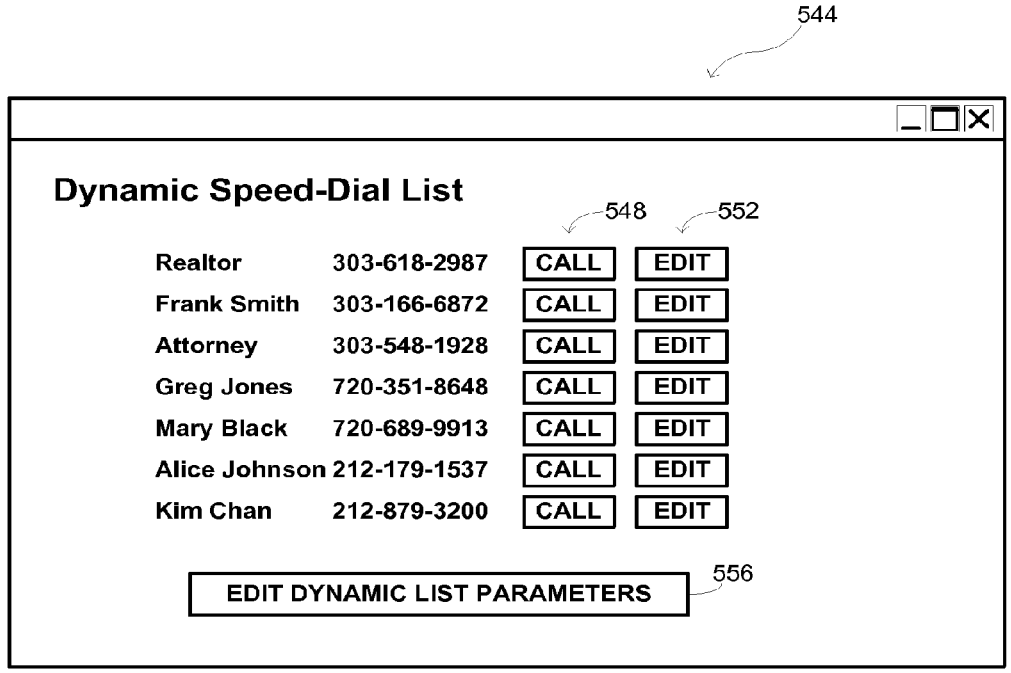
Figure 5D:
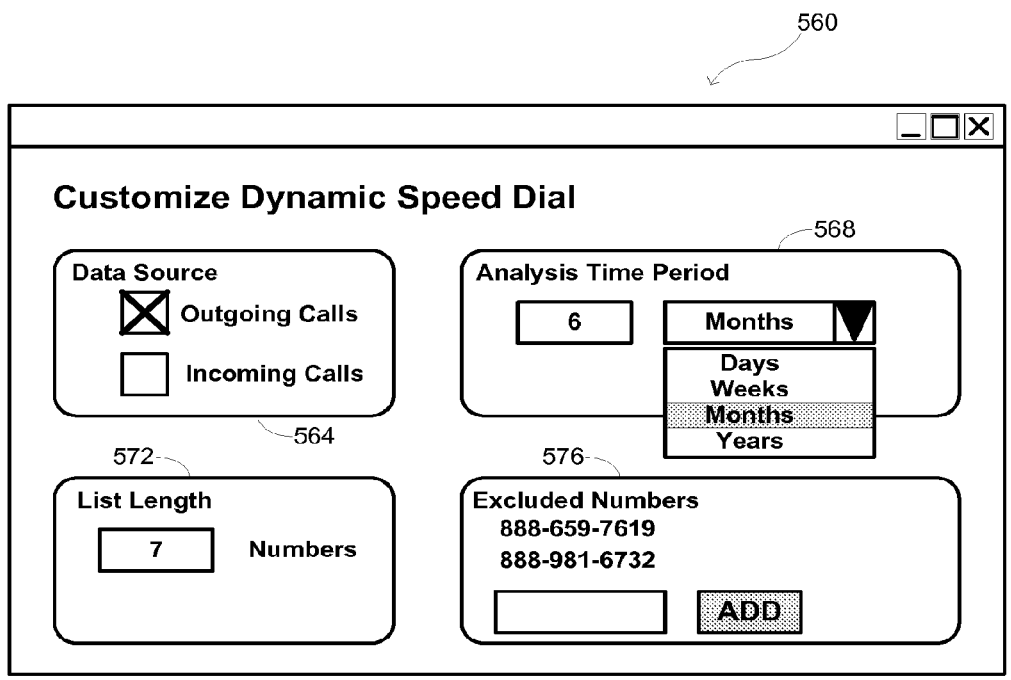

An example of a display of the dynamic list transmitted to the user is shown in FIG. 5C as screen 544. As is evident, the organization of the dynamic list may be similar to that of the static list, with entries specifying such information as a telephone number and an identity of a party. The various options provided as functions that may be executed with the dynamic list may also be similar to those provided for the static list, with the example showing buttons 548 for establishing connections and buttons 552 for editing information about entries. It is also possible in some embodiments to have buttons for deleting entries, but the changing nature of the dynamic list generally makes it preferable to specify numbers that should be excluded from the list as part of defining the algorithm that generates it—without some accommodation, simple deletion of an entry from the dynamic list would not prevent it from recurring through application of the generating algorithm. An additional button 556 may thus be provided to allow the user to edit parameters that define how the algorithm is applied.

The left prong of FIG. 4B shows functions that permit the user to initiate establishment of a communications link, and generally parallel the corresponding functions provided for using the static list to generate a communications link. In particular, the user may select an entry from the dynamic list to call at block 458 by clicking the corresponding CALL button 548. This causes the computational device 126 to transmit a call request to the communications routing network 104, with the request being detected by the application server 112 at block 460. The application server 112 accordingly establishes a connection in accordance with the request at block 462. The EDIT buttons 552 may be used to update information regarding the entries in the dynamic list. The information that may be updated does not usually include the number in the list since it is determined directly by the application server's monitoring of call histories, but may include other identifying information such as names that are used to identify numbers.

The right prong of FIG. 4B illustrates functions that may be performed to define how the algorithm is applied in determining which entries appear on the dynamic list. Access to this functionality may be achieved in response to a request from the user at block 464, such as by having the user click button 556 on screen 544. This may result in a screen 560 like the one in FIG. 5D being displayed to the user and providing an interface by which various of the parameters that define the algorithm may be modified.

In this particular example, the algorithm is defined by parameters that specify which of outgoing and/or ingoing calls are included (fields 564), the length of time spanned by included data (field 568), the length of the list (field 572), and which, if any, numbers should be excluded (field 576). The user may change the length of the list identified in field 572 at block 466. She may also change the identification of the data source in fields 564 at block 470. This identification generally permits either or both of outgoing and incoming calls to be included as explained further above. At block 468, the user may change the period of time identified in field 568 as defining the span of relevant data. At block 472, the user may identify numbers to be excluded from the dynamic list. Such numbers may be specified individually, as has been done in the example of FIG. 5D, or may be specified using indicia that apply to multiple numbers, such as by specifying area codes from which all numbers are to be excluded. It is evident that the fields shown in FIG. 560, and the corresponding functionality illustrated in FIG. 4B, is not exhaustive. There are other parameters that may be used to define the algorithm that is applied in generating the dynamic list, and some of these have been described above. Embodiments of the invention may include any interfaces suitable for changing any of these other parameters.

Thus, having described several embodiments, it will be recognized by those of skill in the art that various modifications, alternative constructions, and equivalents may be used without departing from the spirit of the invention. For example, in some embodiments, multiple numbers corresponding to a single individual may be combined for treatment in determining whether to include them in the dynamic list. Such multiple numbers could correspond to a home number, a work number, and/or a cell number of a person, with the determination whether to include that person on the dynamic list being made in accordance with the combined frequency of calls to or from the person's different numbers. Accordingly, the above description should not be taken as limiting the scope of the invention, which is defined in the following claims.

What is claimed is:

1. A method of managing communications over a communications routing network, the method comprising:
maintaining, by a server in the communications routing network, a data store of records of communications links established over the communications routing network between a first endpoint of the communications routing network and a plurality of second endpoints of the communications routing network which are distinct from the first endpoint;
receiving from a user associated with the first endpoint, a list of weighting parameters, the weighting parameters including at least a weighting parameter based on area codes and a weighting parameter based on locality of telephone numbers;
performing a frequency analysis, over a specified time period, of the records of communications using the list of weighting parameters to identify a frequency of establishing a communications link between the first endpoint and each of the plurality of second endpoints, wherein each of the plurality of second endpoints are weighted based on the weighting parameters, wherein the frequency analysis is limited to those second endpoints with which a communications link with the first endpoint was established during the time period, wherein more recent records of communications within the time period are weighted more heavily than older records of communications within the time period, and wherein a length of the time period is based on calling patterns of the user, such that users whose calling patterns change frequently are assigned relatively shorter time periods and users whose calling patterns change infrequently are assigned relatively longer time periods;
generating a first dynamic speed-dial list of a subset of the plurality of second endpoints in accordance with a result of the frequency analysis, wherein the first dynamic speed-dial list is ordered according to the frequency of establishing the communication link, during the time period, between the first endpoint and each of the plurality of second endpoints.

2. The method recited in claim 1 further comprising transmitting the first dynamic speed-dial list to a computational device of a user associated with the first endpoint.

3. The method recited in claim 1 further comprising maintaining in the data store a static list associated with the first endpoint, the static list being defined by the user.

4. The method recited in claim 3 wherein the generating of the first dynamic speed-dial list comprises excluding second endpoints that are comprised by the static list.

5. The method recited in claim 1 wherein performing the frequency analysis comprises limiting the frequency analysis to those second endpoints with which a communications link with the first endpoint was established for at least a defined length of time.

6. The method recited in claim 5 wherein the defined time period is defined by a user associated with the first endpoint.

7. The method recited in claim 1 wherein performing of the frequency analysis comprises excluding previously identified second endpoints from the frequency analysis.

8. The method recited in claim 1 wherein performing of the frequency analysis comprises including communications links initiated from the first endpoint.

9. The method recited in claim 1 wherein performing of the frequency analysis comprises including communications links initiated from one of the second endpoints.

10. The method recited in claim 1 wherein performing of the frequency analysis comprises including communications links initiated from the first endpoint or communications links initiated from one of the second endpoints.

11. The method recited in claim 1 further comprising:
receiving an identification of one of the subset of the plurality of second endpoints of the list from the first endpoint; and
establishing a communications link between the first endpoint and the one of the subset of the plurality of second endpoints.

12. The method recited in claim 1 further comprising:
receiving a request from the first endpoint to establish a communications link between the first endpoint and one of the plurality of second endpoints;
establishing the communications link between the first endpoint and the one of the plurality of second endpoints; and
re-performing the frequency analysis of the plurality of second endpoints to include information related to establishing the communications link between the first endpoint and the one of the plurality of second endpoints.

13. The method recited in claim 1, wherein the list of weighting parameters includes a weighting parameter based on an endpoint being a land-line number as opposed to a cellular number.

14. A communications routing network, comprising:
a plurality of communication devices coupled with the communication network by a plurality of endpoints;
a server coupled with the plurality of communication devices, the server comprising logic instructions stored in a computer-readable medium which, when executed by a computer, configure the computer to manage dynamic speed-dial lists associated with the plurality of communication devices by performing operations, comprising:
maintaining a data store of records of communications links established over the communications routing network between a first endpoint of the communications routing network and a plurality of second endpoints of the communications routing network which are distinct from the first endpoint;
receiving from a user associated with the first endpoint, a list of weighting parameters, the weighting parameters including at least a weighting parameter based on area codes and a weighting parameter based on locality of telephone numbers;
performing a frequency analysis, over a specified time period, of the records of communications using the list of weighting parameters to identify a frequency of establishing a communications link between the first endpoint and each of the plurality of second endpoints, wherein each of the plurality of second endpoints are weighted based on the weighting parameters, wherein the frequency analysis is limited to those second endpoints with which a communications link with the first endpoint was established during the time period, wherein more recent records of communications within the time period are weighted more heavily than older records of communications within the time period, and wherein a length of the time period is based on calling patterns of the user, such that users whose calling patterns change frequently are assigned relatively shorter time periods and users whose calling patterns change infrequently are assigned relatively longer time periods; and generating a first dynamic speed-dial list of a subset of the plurality of second endpoints in accordance with a result of the frequency analysis, wherein the first dynamic speed-dial list is ordered according to the frequency of establishing the communication link, during the time period, between the first endpoint and each of the plurality of second endpoints.

15. The communication routing network of claim 14, wherein the server further comprises logic instructions stored in a computer-readable medium which, when executed by the computer, configure the computer to transmit the first dynamic speed-dial list to a computational device of a user associated with the first endpoint.

16. The communication routing network of claim 14, wherein the server further comprises logic instructions stored in a computer-readable medium which, when executed by the computer, configure the computer to maintain in the data store a static list associated with the first endpoint, the static list being defined by the user.

17. The communication routing network of claim 16, wherein the server further comprises logic instructions stored in a computer-readable medium which, when executed by the computer, configure the computer to exclude second endpoints that are comprised by the static list.

18. The communication routing network of claim 14, wherein the server further comprises logic instructions stored in a computer-readable medium which, when executed by the computer, configure the computer to limit the frequency analysis to those second endpoints with which a communications link with the first endpoint was established within a defined time period.

* * * * *